(12) United States Patent
Rosolio et al.

(10) Patent No.: US 11,189,189 B2
(45) Date of Patent: Nov. 30, 2021

(54) IN-FLIGHT TRAINING SIMULATION DISPLAYING A VIRTUAL ENVIRONMENT

(71) Applicant: Elbit Systems Ltd., Haifa (IL)

(72) Inventors: Beery Rosolio, Haifa (IL); Lior Marcus Bachar, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

(21) Appl. No.: 17/260,050

(22) PCT Filed: Jul. 29, 2019

(86) PCT No.: PCT/IL2019/050855
§ 371 (c)(1),
(2) Date: Jan. 13, 2021

(87) PCT Pub. No.: WO2020/026235
PCT Pub. Date: Feb. 6, 2020

(65) Prior Publication Data
US 2021/0295732 A1 Sep. 23, 2021

(30) Foreign Application Priority Data
Aug. 2, 2018 (IL) .......................................... 260960

(51) Int. Cl.
*G09B 9/24* (2006.01)
*G09B 9/30* (2006.01)
(Continued)

(52) U.S. Cl.
CPC .............. *G09B 9/24* (2013.01); *G06N 20/00* (2019.01); *G09B 9/302* (2013.01); *G09B 9/307* (2013.01); *G09B 9/44* (2013.01); *G09B 9/46* (2013.01)

(58) Field of Classification Search
CPC .......... G09B 9/30; G09B 9/302; G09B 9/307; G09B 9/24; G09B 9/44; G09B 9/46; G06N 20/00
See application file for complete search history.

(56) References Cited

U.S. PATENT DOCUMENTS 5,566,073 A 10/1996 Margolin
7,479,967 B2 1/2009 Bachelder et al.
(Continued)

FOREIGN PATENT DOCUMENTS

WO 9720244 A1 6/1997
WO 03096303 A1 11/2003

OTHER PUBLICATIONS

International Preliminary Report on Patentability dated Feb. 2, 2021 for PCT/IL2019/050855 filed Jul. 29, 2019.

*Primary Examiner* — Timothy A Musselman
(74) *Attorney, Agent, or Firm* — Paul D. Bianco; Gary S. Winer; Fleit Intellectual Property Law (57) ABSTRACT

Method and system for displaying virtual environment during in-flight simulation. A simulation environment is selected for a training simulation of an airborne platform operating in flight within a real environment. The position and orientation of a display viewable by an operator of the airborne platform is determined with respect to the selected simulation environment. The display displays at least one simulation image comprising a view from a virtual altitude of simulation environmental terrain in the selected simulation environment, while the airborne platform is in flight at a real altitude above the real environmental terrain in the real environment, the virtual altitude above the simulation environmental terrain being a lower altitude than the real altitude above the real environmental terrain. The simulation image is displayed in accordance with the determined position and
(Continued)

orientation of the display, such that the simulation environment is adaptive to operator manipulations of the airborne platform.

19 Claims, 4 Drawing Sheets

(51) Int. Cl.
*G06N 20/00* (2019.01)
*G09B 9/44* (2006.01)
*G09B 9/46* (2006.01)

(56) References Cited

U.S. PATENT DOCUMENTS

| | | |
|---|---|---|
| 8,784,107 B2 | 7/2014 | Testrake et al. |
| 9,599,821 B2 | 3/2017 | Van Curen et al. |
| 9,646,417 B1 | 5/2017 | Sowadski et al. |
| 2011/0027761 A1 | 2/2011 | Nunez et al. |
| 2013/0063435 A1 | 3/2013 | Stannard et al. |
| 2017/0294135 A1 | 10/2017 | Lechner |

IN-FLIGHT TRAINING SIMULATION DISPLAYING A VIRTUAL ENVIRONMENT

CROSS-REFERENCE TO RELATED APPLICATIONS

This application is a National Phase application filed under 35 U.S.C. § 371 of PCT International Application No. PCT/IL2019/050855 with an International Filing Date of Jul. 29, 2019, which claims priority to Israel Patent Application No. 260960, filed on Aug. 2, 2018, the entire contents of which are incorporated herein by reference.

FIELD OF THE INVENTION

The present invention generally relates to aircraft display systems, flight simulators, and virtual reality.

BACKGROUND OF THE INVENTION

Flight simulations are a standard technique for pilot training. Such simulations attempt to realistically portray the response of an aircraft to flight control manipulations by a trainee under different scenarios. A typical simulation replicates the physical flight controls of the aircraft and resultant aircraft motion while depicting the external view seen through the cockpit display. The simulation ideally takes into account various physical and environmental factors that may influence the aircraft, such as air density, turbulence, wind, clouds, and the like. A flight simulator may be a dedicated ground-based simulator designed to replicate a real aircraft cockpit and utilizing computer-generated visual representations and predefined modelings of different aircrafts. In an "in-flight simulation", the simulator is embedded in a real aircraft, which can allow a more authentic experience that provides realistic external visual and motion cues. The training pilot may have some degree of control of the aircraft, such as being able to guide the aircraft to a predetermined point after which the automated simulation takes over, which can be used to test out new control systems or information displays.

An in-flight simulator may display the simulated imagery onto a see-through display, such as a head-up display (HUD) or a head-mounted display (HMD), such that the simulation environment is overlaid onto the external view of the physical environment. The simulation images generally depict elements of interest in the training arena, such as other aircrafts or environmental features such as terrain or obstacles encountered along the aircraft trajectory, together with symbols or indicators representing relevant flight parameters (e.g., airspeed; altitude; heading; a horizon line; and the like). The simulation images may also depict virtual elements or special effects, such as an explosion of a fired weapon or a successful target strike, which may be displayed in the context of real features present in the simulation environment. The simulation may also provide auditory stimulus, such as verbal flight commands or audible alerts, and/or tactile stimulus, such as by replicating the effects of the aircraft motion.

Quality training for aircraft pilots in general, and for helicopter pilots in particular, requires considerable time and resources and is difficult to coordinate. The pilot may require training for a variety of different missions and flight maneuvers, such as: coordination of ground troops, exposure to different threats and environments, search and rescue missions in both sea and land, and obstacle avoidance. Some of these missions or maneuvers involve exceedingly high risks. When executed with a ground-based simulator, the training pilot may not obtain a sufficiently realistic experience, which diminishes the training effectiveness and reduces the level of preparation to operate under real-world conditions. If executed with an actual aircraft, then there is the danger of exceeding safety thresholds and potentially damaging the aircraft and/or harming onboard crew members, in addition to the extensive resource allocation associated with the training flight itself.

U.S. Pat. No. 7,479,967 to Bachelder et al., entitled: "System for combining virtual and real-time environments", discloses a system that combines captured real-time video data and real-time 3D environment rendering to create a fused environment. The captured video imagery is processed to determine which areas should be made transparent or have other color modifications made, based on sensed cultural features and/or sensor line-of-sight. Sensed features can include electromagnetic radiation characteristics, such as color, infrared, ultraviolet light values. Cultural features can include patterns of these characteristics, such as object recognition using edge detection. The processed image is overlaid on a 3D environment to combine the two data sources into a single scene, creating an effect where a user can look through "windows" in the video image into a 3D simulated world or see other enhanced or reprocessed features of the captured image.

U.S. Pat. No. 8,784,107 to Testrake et al., entitled: "Flight training system", discloses a system and method for flight training which includes an in-flight component and a ground component. A set of flight data about an aircraft during a training flight is collected and stored in the in-flight component. A simulation of the training flight is provided at the ground component based on the set of flight data collected during the training flight. A student may participate in the stimulation by providing input from a set of controls. An instructor may provide modified flight data which can be used to modify the simulation, allowing for the analysis and simulation of a variety of hypothetical situations. The simulation may be modified based on a received set of modified flight data. located perpendicularly above and not in contact with the centerline.

U.S. Pat. No. 9,599,821 to Van Curren et al., entitled: "Virtual reality system allowing immersion in virtual space to consist with actual movement in actual space", discloses a virtual reality system that includes a playground defined within a real-world space to have a predetermined area in which a user is movable. A head mounted device (HMD) worn by the user surrounding both eyes displays a fully virtual image of a virtual space formed corresponding to real objects in the playground. A sensor attached to a predetermined location in the playground, the HMD or body of the user, senses an actual location or motion of the user in the playground. A control unit calculates a location and direction of the user in the playground according to a signal received from the sensor, and directs the HMD to display an image of the virtual space, observed at the actual location and in the facing direction of the user. The user wearing the HMD and moving in the playground is thus given a feeling of moving in the virtual space.

U.S. Patent Application No. 2017/0294135 to Lechner, entitled: "Real-time in-flight simulation of a target", discloses a system and method for real-time in-flight simulation of a target on a display onboard an aircraft. A live stream of the aircraft environment is generated during the aircraft flight, the live stream having metadata with structured information indicating a real-time position of the aircraft within the environment. A target image is generated from a source with multiple different target images, such as a virtual or constructive environment or an on-ground training system, and a synthetic scene of the environment including the target image is generated. The synthetic scene is superimposed onto the live stream such that the target image is spatially and temporally correlated with the real-time position of the aircraft within the environment, and the live stream with superimposed synthetic scene is presented on an aircraft display during the flight.

U.S. Patent Application No. 2013/0063435 to Stannard et al., entitled: "Simulating a terrain view from an airborne point of view", discloses the simulation of a terrain view from an airborne object at a location remote from the airborne object. A geo-referenced terrain model of the terrain is obtained at a remote location. Position and orientation information relating to the airborne object at the remote location is obtained and correlated with the geo-referenced terrain model. A corresponding simulated view from the airborne object of the terrain is generated and displayed to an observer at the remote location. The remote location may be at ground level.

SUMMARY OF THE INVENTION

In accordance with one aspect of the present invention, there is thus provided a method for displaying a virtual environment during an in-flight simulation. The method includes the procedures of selecting a simulation environment for a training simulation of an airborne platform, operating the airborne platform in a flight within a real environment, and determining the position and orientation with respect to the selected simulation environment of a display viewable by an operator of the airborne platform. The method further includes the procedures of displaying at least one simulation image on the display, in accordance with the determined position and orientation, the simulation image including a view from a virtual altitude of simulation environmental terrain in the selected simulation environment, while the airborne platform is in flight at a real altitude above real environmental terrain in the real environment, the virtual altitude above the simulation environmental terrain being a lower altitude than the real altitude above the real environmental terrain, and displaying the simulation image such that the simulation environment is adaptive to operator manipulations of the airborne platform. The airborne platform may be subject to physical constraints associated with the simulation environment. The display may be configured to display at least one virtual element or supplementary image associated with the simulation environment. The simulation environment may include: a search and rescue scenario; an urban combat scenario; a mountainous terrain; a nautical terrain; a low altitude flight; a nap-of-the-earth (NOE) type flight; an engagement with aerial threats; a flight formation with other airborne platforms; a ground troops coordination scenario; and/or an obstacle avoidance scenario. The method may further include the procedure of ensuring that the airborne platform does not exceed at least one safety threshold. The airborne platform may be a helicopter. The display may be a see-through display, where the simulation image is displayed overlaid onto the external scene. The method may further include the procedure of performing a statistical analysis of at least one training simulation using a machine learning process. The training simulation may be customized for the operator, based on information learned about the operator from a statistical analysis using the machine learning process.

In accordance with another aspect of the present invention, there is thus provided a system for displaying a virtual environment during an in-flight simulation. The system includes a display, a detector and a processor. The display is viewable by an operator of an airborne platform. The detector is configured to detect the position and orientation of the display with respect to a selected simulation environment of a training simulation of the airborne platform. The processor is configured to retrieve at least one simulation image including a view from a virtual altitude of the simulation environmental terrain in the selected simulation environment, while the airborne platform is in flight at a real altitude above the real environmental terrain in the real environment, the virtual altitude above the simulation environmental terrain being a lower altitude than the real altitude above the real environmental terrain. The display is configured to display the simulation image in accordance with the detected position and orientation, such that the simulation environment is adaptive to operator manipulations of the airborne platform. The airborne platform may be subject to physical constraints associated with the simulation environment. The display may be configured to display at least one virtual element or supplementary image associated with the simulation environment. The simulation environment may include: a search and rescue scenario; an urban combat scenario; a mountainous terrain; a nautical terrain; a low altitude flight; a nap-of-the-earth (NOE) type flight; an engagement with aerial threats; a flight formation with other airborne platforms; a ground troops coordination scenario; and/or an obstacle avoidance scenario. The airborne platform may be a helicopter. The system may include an image sensor, configured to capture at least one image of the real environment. The system may include flight instruments, configured to provide real-time flight parameters of the airborne platform. The system may further include a database including images of simulation environments and information relating to training simulations. The system may include a digital elevation map including terrain information. The system may further include a geographic information source, configured to provide real-time information relating to the real environment or simulation environment. The display may be a see-through display, where the simulation image is displayed overlaid onto the external scene. The display may be a head-up display (HUD) of the airborne platform, or a head-mounted display (HMD) worn by the operator of the airborne platform. The processor may be further configured to perform a statistical analysis of at least one training simulation using a machine learning process. The training simulation may be customized for the operator, based on information learned about the operator from a statistical analysis using the machine learning process.

BRIEF DESCRIPTION OF THE DRAWINGS

The present invention will be understood and appreciated more fully from the following detailed description taken in conjunction with the drawings in which.

DETAILED DESCRIPTION OF THE EMBODIMENTS

The present invention overcomes the disadvantages of the prior art by providing a system and method for displaying a virtual simulation environment in a flying aircraft, enabling the aircraft operator to implement high-risk flight maneuvers in a training simulation flight respective of a real-world scenario, and to perceive the effects within the simulated environment, while ensuring safety limits are maintained by the aircraft. The present invention provides for simulation of dangerous and/or difficult flight scenarios in a manner that reflects the actual conditions in the environment being simulated, which results in enhanced training capabilities, particularly for helicopter flight training.

Figure 1:
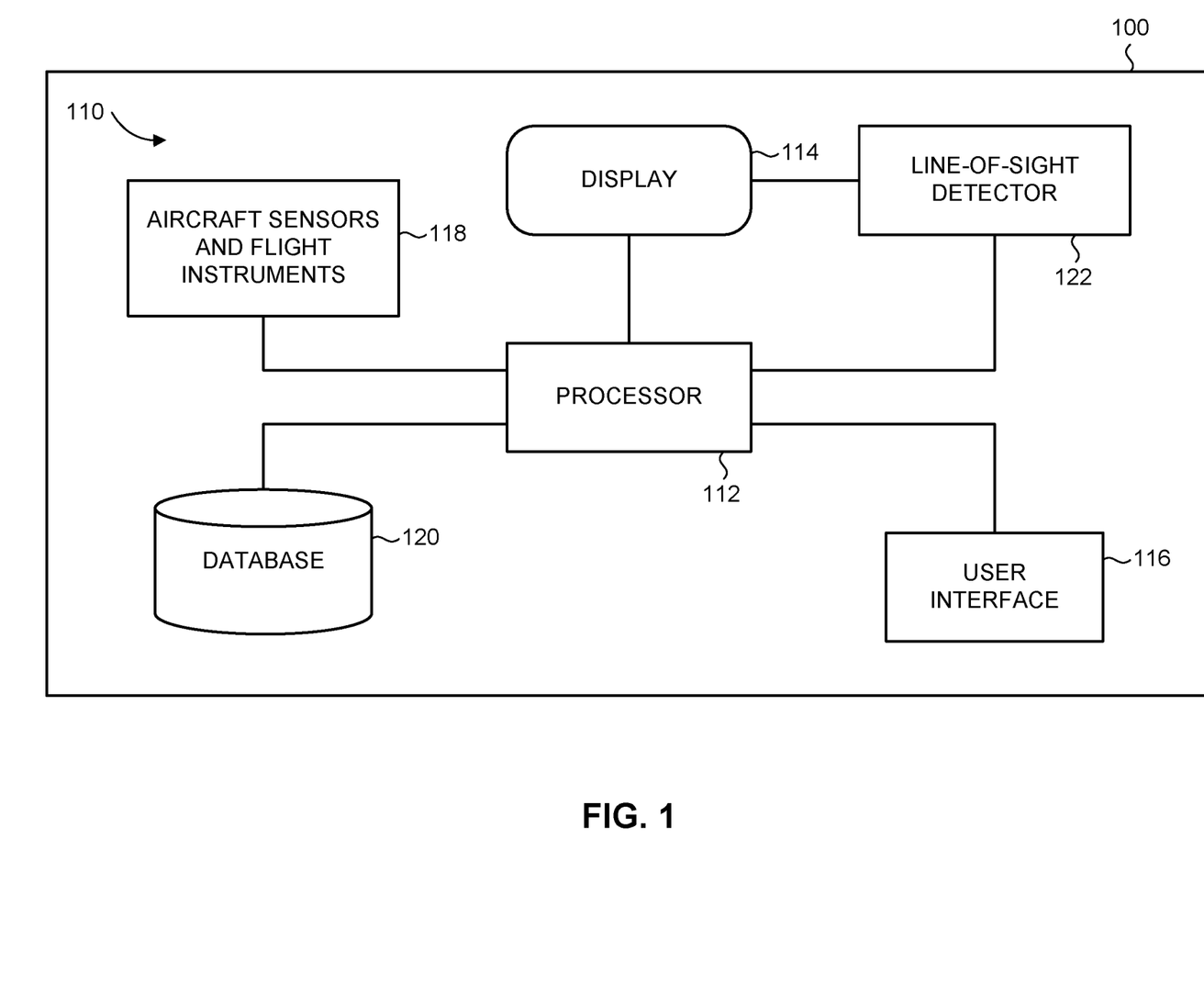
FIG. 1 is a schematic illustration of a system for displaying a virtual environment during an in-flight simulation, constructed and operative in accordance with an embodiment of the present invention.

Reference is now made to FIG. 1, which is a schematic illustration of a system, generally referenced 110, for displaying a virtual environment during an in-flight simulation, constructed and operative in accordance with an embodiment of the present invention. System 110 includes a processor 112, a display 114, a user interface 116, aircraft sensors and flight instruments (ASFI) 118, a database 120, and a line-of-sight (LOS) detector 122. Processor 112 is communicatively coupled with display 114, with user interface 116, with ASFI 118, with database 120, and with LOS detector 122.

System 110 is generally installed on an aircraft, referenced 100, although some components may reside at a different location and may be accessible to processor 112 through a wireless communication link. For example, system 110 is installed (at least partially) in the cockpit of aircraft 100. The term "aircraft" as used herein should be broadly interpreted to refer to any type of airborne platform or vehicle capable of flight, including but not limited to: an airplane or a helicopter, of any type or model, and encompassing also such aircrafts with at least partial autonomous flight control capabilities. The term "operator" herein refers to any person or group of persons operating the system or method of the present invention. For example, the operator may be an aircraft pilot or other aircraft crew member involved with the operation and maneuvering of aircraft 100.

Display 114 is configured to display the flight simulation images to the operator. Display 114 may be a transparent or "see-through" display device, such that the operator can simultaneously observe the displayed virtual reality image overlaid in the foreground onto a background view of the external environment viewable through the display. The simulation image may include supplementary content such as graphics, text or symbols superimposed onto the background view, as will be discussed further below. Display 114 may be embodied by a fixed display, such as a head-up display (HUD) or a head-down display (HDD) integrated in the cockpit of aircraft 100. Alternatively, display 114 may be a head-mounted display (HMD) embedded within a wearable apparatus worn by the operator.

User interface 116 allows the operator to control various parameters or settings associated with the components of system 110. For example, user interface 116 can allow the operator to provide instructions or select parameters associated with the displayed flight simulation image. User interface 116 may include a cursor or touch-screen menu interface, such as a graphical user interface, configured to enable manual input of instructions or data. User interface 116 may also include communication devices configured to provide voice communication, such as a microphone and an audio speaker, as well as voice recognition capabilities to enable entering instructions or data by means of speech commands. User interface 116 may also enable the operator to communicate with external sources, such as a remotely located aircraft control operator.

Aircraft sensors and flight instruments (ASFI) 118 includes various devices configured to measure or detect real-time flight information associated with aircraft 100, such as: position, location, heading, altitude, airspeed, velocity, rate of turn indication, slip-skid indication, course deviation indication, and the like. ASFI 118 may incorporate various onboard flight instruments or other diagnostic tools. For example, the aircraft position may be obtained from an aircraft navigation system, which may include components or applications associated with a global positioning system (GPS), inertial navigation system (INS) or global navigation satellite system (GNSS) as known in the art. ASFI 118 may also detect relevant environmental information, such as: temperature, pressure, wind speed and wind direction, and the like. System 110 may also receive information from external data sources, such as a ground radar (e.g., at an airport or air traffic control station), or an automatic dependent surveillance-broadcast (ADS-B) system. For example, ADS-B communication may be used to enhance the accuracy of the aircraft position. ASFI 118 may also include one or more cameras to provide images of the external environment.

Database 120 contains information relating to real-world simulation environments for aircraft 100. For example, database 120 may include maps or models of different geographic areas, including 3D geographic models, such as a digital elevation model (DEM) or digital terrain model (DTM). Database 120 may also include other relevant information, such as: weather or climate forecasts; predefined flight routes; simulation data for potential threats (e.g., anti-aircraft weapons such as surface-to-air missiles or air-to-air missiles); and simulation missions (e.g., locations for take-off, troop collection; attacking, etc). Database 120 may be located externally to aircraft 100 but communicatively coupled with system 110, such that system 110 may receive information from database 120 while aircraft 100 is in flight.

LOS detector 122 provides a measurement of a line-of-sight according to which the simulation images may be displayed. The measured line-of-sight may be the viewing angle of the operator, or the position and orientation of display 114, which represents a viewpoint of the external scene as viewed by the operator though display 114. For example, LOS detector 122 may include a head tracking device configured to determine the real-time head direction of the operator, and/or an eye tracking device configured to determine the real-time eye gaze direction of the operator. LOS detector 122 may include one or more devices or instruments configured to measure the position and orientation of display 114 with respect to a reference coordinate system, such as: a global positioning system (GPS); a compass; an inertial navigation system (INS); an inertial measurement unit (IMU); motion sensors or rotational sensors (e.g., accelerometers, gyroscopes, magnetometers); a rangefinder; and the like. LOS detector 122 may utilize the location of aircraft 100 for calculating the position and orientation of display 114, and may further utilize a flight route of aircraft 100, as well as other relevant real-time flight parameters, to allow the determination of an updated location over time.

Processor 112 generally performs any data processing required by system 110, and may receive information or instructions from other components of system 110. In particular, processor 112 may determine navigational parameters of aircraft 100 performing a flight training simulation, and direct the displaying of a simulation image respective of the actual flight location of aircraft 100, as will be discussed further hereinbelow.

The components and devices of system 110 may be based in hardware, software, or combinations thereof. It is appreciated that the functionality associated with each of the devices or components of system 110 may be distributed among multiple devices or components, which may reside at a single location or at multiple locations. For example, the functionality associated with processor 112 may be distributed between multiple processing units. Processor 112 may be part of a server or a remote computer system accessible over a communications medium or network, or may be integrated with other components of system 110, such as incorporated with a computer associated with display 114. System 110 may optionally include and/or be associated with additional components not shown in FIG. 1, for enabling the implementation of the disclosed subject matter. For example, system 110 may include a power supply (not shown) for providing power to various components, and may further include a memory or storage unit (not shown) for temporary storage of images or other data.

The term "image" as used herein may refer to a video image or a plurality of image frames presented in sequence. In accordance with an embodiment of the present invention, a displayed virtual reality image may be a video image that is dynamically updated to correspond to the real-time updated flight location of aircraft 100.

The term "repeatedly" as used herein should be broadly construed to include any one or more of: "continuously", "periodic repetition" and "non-periodic repetition", where periodic repetition is characterized by constant length intervals between repetitions and non-periodic repetition is characterized by variable length intervals between repetitions.

The operation of system 110 will now be described in general terms, followed by specific examples. System 110 selects a training simulation for aircraft 100 based on a virtual simulation environment, such as using a flight simulation generator (not shown) and/or information stored in database 120. The virtual simulation environment may correspond to a real-world environment or an artificial (fictional) environment. For example, the simulation environment may be a training flight in low altitude, such as for a search and rescue training mission. The simulation environment is associated with spatial coordinates representing a geographic location respective of a reference coordinate system.

Aircraft 100 is flown along a flight path, such as in a designated flight region for conducting the training simulation. For example, if the (virtual) simulation environment represents a low-altitude flight pattern over a rugged mountainous terrain or over a body of water (e.g., a sea or lake), the (actual) flight environment may be a high-altitude flight pattern over a desert terrain, such as in a designated geographic area generally utilized for aircraft training purposes. Additional examples of simulation environments may include: flights in harsh weather conditions, and flights in the vicinity of high-risk threats.

Processor 112 receives navigational information of aircraft 100 operating in the real environment while performing the training simulation, and determines at least the location (position and heading) of aircraft 100 from the obtained navigational information. More specifically, processor 112 determines the position and orientation of the display 114 viewed by the aircraft operator, with respect to the position and orientation of the virtual simulation environment, where the position and orientation of display 114 is a function of the position and orientation of the aircraft 100 and/or the head of the operator (corresponding to the operator gaze direction). Images of the training simulation are then displayed to the aircraft operator in accordance with the updated location of display 114 in relation to the location of the simulation environment, such that the operator perceives the aircraft 114 being situated within the (virtual) simulation environment rather than within the real environment. The displayed simulation images are responsive to the flight control and maneuvering of aircraft 100 by the operator to support the perception of the simulation. The simulation images are displayed in the form of synthetic (virtual reality) images of the simulation environment, which may be overlaid onto a view of the external scene (i.e., the real environment) as seen by the operator via a see-through display). Alternatively, the displayed simulation images replace the external environment view, such that only the simulation images are viewable on display 114. For example, a simulation video image may be displayed on a night vision display device, such as night vision goggles (NVG), in order to simulate a flight during nighttime or other reduced-visibility conditions. The displayed simulation environment may be based on images captured by a camera or sensor in real-time, or based on previously captured images (stored in database 120)

Figure 2:
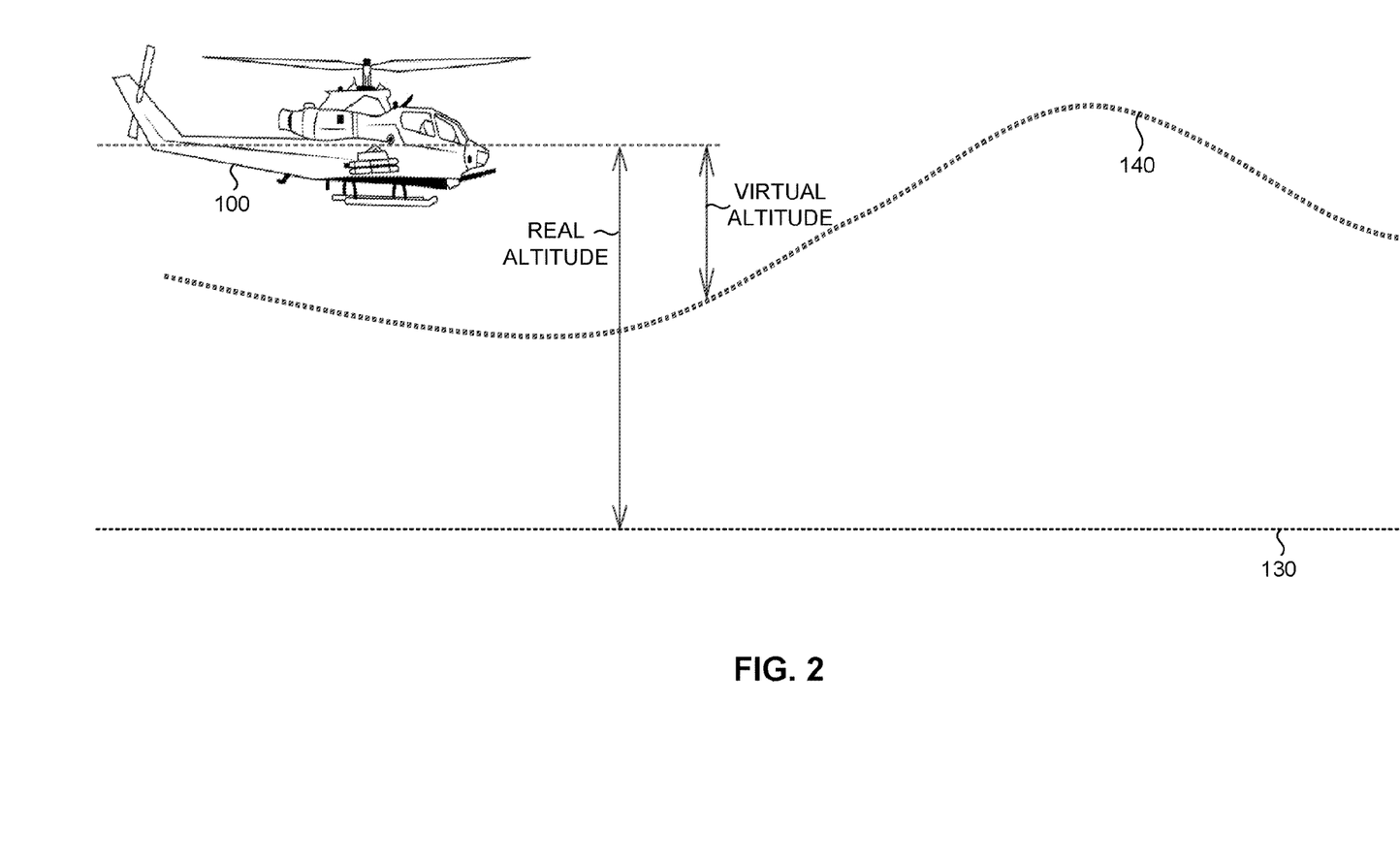
FIG. 2 is a schematic illustration of an aircraft undergoing an in-flight training simulation in a virtual environment, operative in accordance with an embodiment of the present invention.
Figure 3:
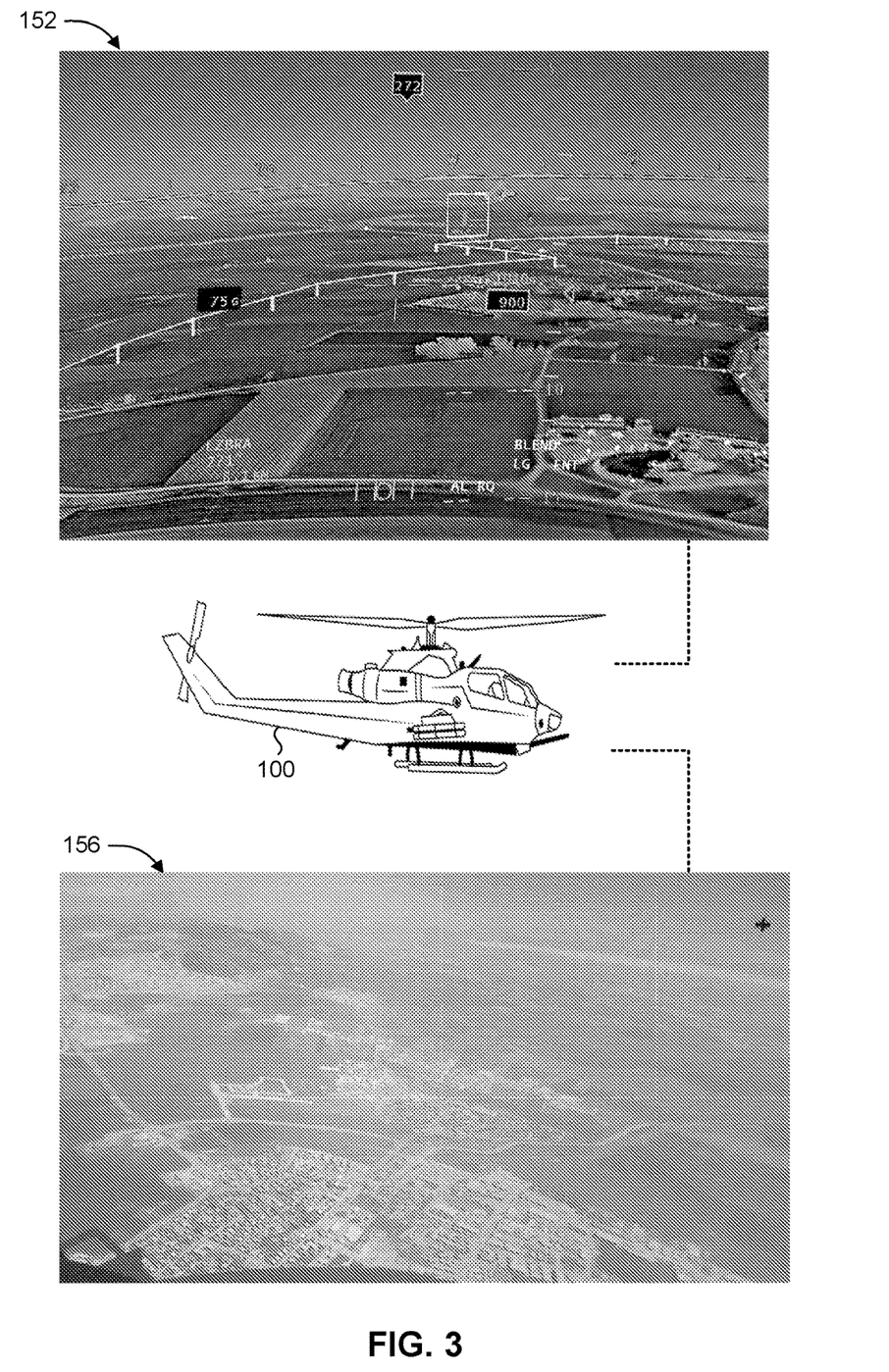
FIG. 3 is an illustration of an exemplary display view during an in-flight training simulation in a virtual environment, operative in accordance with an embodiment of the present invention.

Reference is now made to FIGS. 2 and 3. FIG. 2 is a schematic illustration of an aircraft undergoing an in-flight training simulation in a virtual environment, operative in accordance with an embodiment of the present invention. FIG. 3 is an illustration of an exemplary display view during an in-flight training simulation in a virtual environment, operative in accordance with an embodiment of the present invention. Aircraft 100 is flying over a real environment terrain, generally referenced 130, while undergoing a flight simulation with respect to a virtual environmental terrain, generally referenced 140. The altitude of aircraft 100 in relation to simulation terrain 140 is lower than the altitude of aircraft 100 in relation to real terrain 130, thereby simulating a "low-altitude" flight pattern over a virtual terrain 140 while in reality performing a "high-altitude" flight (over real terrain 130). A simulation image (e.g., a video image) depicting the simulation terrain 140 is presented on display 114 respective of the actual flight pattern of aircraft 100 pursuant to flight control and maneuvering by the operator, such that the real movements of aircraft 100 are reflected in a changing depiction of the simulation environment so as to provide the perception that aircraft 100 is moving within the simulation environment. An exemplary virtual simulation environment presented on display 114 can be seen in display view 152. In particular, display view 152 is a forward-looking infrared (FLIR) image portraying a low-altitude flight pattern over virtual terrain 140, while aircraft 100 is actually in a high-altitude flight over real terrain 140 as shown in display view 156 of the (real) external environment.

More generally, system 110 presents a virtual simulation environment which is different from the actual flight environment of the aircraft, where the differences can include at least one of: position, orientation and/or altitude of the aircraft. For example, the aircraft may be guided to a flight pattern at an altitude of approximately 5000 feet while simulating flight maneuvers that can be only be done at much lower altitudes (e.g., at approximately 120 feet). In this manner, the aircraft operator can safely avoid potential obstacles along the flight path, while being able to simulate flying in low-altitude conditions with the aircraft subjected to a heavier weight (which makes maneuvering more difficult) due to the greater air pressure present at higher altitudes, and thereby enhance the training session.

The simulation may represent a high-risk mission or scenario for which it would otherwise be unreasonably difficult or dangerous to train. For example, the simulated scenario may be a low-altitude flight pattern such as a "nap-of-the-earth (NOE) flight", which is used by military aircraft to avoid detection in high threat environments. Other exemplary scenarios may include a direct engagement with aerial threats, such as a missile attack by enemy sources, or a joint flight with additional aircrafts, such as a flight formation with virtual wingmen.

The simulation may incorporate characteristics that reflect the conditions present in a real environment corresponding to the simulated training scenario, and the aircraft may be subject to physical constraints associated with the environment. For example, a helicopter simulating a virtual low-altitude flight scenario will experience the same conditions and flight limitations as would be experienced if it were flying in a corresponding real low altitude flight, such as by simulating applicable limitations on the flight envelope conditions. The simulation may also involve limitations on which flight maneuvers can be performed and in what manner. For example, system 110 may simulate an engine malfunction of aircraft 100 by displaying a symbol depicting engine power status and restricting the operator to only use a certain amount of engine power, even though in reality the aircraft maintains full engine capabilities.

System 110 may further ensure that aircraft 100 does not exceed various safety thresholds while performing the simulation flight. These safety thresholds may include but are not limited to: maintaining a safe flight altitude (not too high or too low); avoiding scenarios that can lead to aircraft stall, such as by not exceeding the critical angle attack and/or maintaining minimum airspeed; and avoiding collisions with potential obstacles such as other aircrafts along the flight path. The operator or a co-pilot may validate that the relevant safety thresholds are met during the simulation flight, such as based on information obtained from existing aircraft warning systems and flight instruments.

The simulation environment may include virtual elements or features intended to augment the simulation, such as to help portray specific training scenarios. Simulated elements may represent various objects in the simulation environment, such as: other aircrafts, naval vessels, armored carriers, infantry troops, flight obstacles, and the like. The displayed simulation image may include supplementary imagery, such as symbols, graphics or text, associated with relevant portions of the virtual environment, in order to provide notable information or to emphasize significant features, such as a designation of enemy targets or friendly forces. The simulation image may also depict weapon firings, such as a firing of a surface to air missile (SAM), with indications of successful or unsuccessful target hits. Further displayed information may include flight instructions, navigational parameters, weather and climate data (e.g., instrument meteorological conditions (IMC)), and other important information relating to the simulated environment (and/or the real environment) of the aircraft. The virtual elements or supplementary imagery may be displayed with selected visual modifications, such as by using symbols with different contrasts, colors, shapes and/or sizes, such as to indicate the relative importance or severity level of the respective feature. For example, a simulated enemy aircraft deemed to be a "high risk" target may be displayed in bold or highlighted or otherwise appear more visually captivating in the displayed image as compared to other targets of lesser importance. Various notifications or warnings may also be displayed, such as via a text message or a symbol representation. The notification may be displayed overlaid conformally onto or adjacent to a relevant feature in the simulation environment to which the notification pertains. A notification or warning may also be provided in in audible form (i.e., instead of or in additional to the visual indication), such as by emitting an audible alarm sound to alert the operator that a dangerous situation is impending (e.g., if the simulation flight is approaching a predefined safety threshold limit).

The operator may also provide instructions to switch between a view of the simulation environment and a view of the real environment, or a combined view of the simulation environment overlaid onto the real environment, as necessary, or the views may be switched automatically if certain conditions are met, such as if the aircraft is approaching a safety threshold limit.

According to an embodiment of the present invention, artificial intelligence may be applied to enhance the flight simulation. For example, the same flight simulation may be provided simultaneously to a plurality of operators (e.g., 50 different pilots) at respective aircrafts, and the results of all the simulations can be subsequently analyzed using a machine learning process to identify relevant patterns and performance statistics. For example, average or baseline values or other performance metrics for certain flight maneuvers can be extracted from the simulation results, allowing for the evaluation of individual operators with respect to these baseline metrics, such as during a debriefing session following the simulation flight. The data analysis may also involve establishing classifications or behavioral profiles for different operators based on common features. In another example, a machine learning process may be applied in order to learn the habits and capabilities of each operator, allowing for customizing the provided simulations. For example, a first operator may require a longer timespan (e.g., 10 seconds) for implementing a certain maneuver as compared to a second operator for whom a shorter timespan (e.g., 3 seconds) may be sufficient. Such artificial intelligence or machine learning applications may utilize any suitable technique or process, including but not limited to: neural network algorithms, deep learning algorithms, and/or regression models.

It will be appreciated that the present invention may provide a high-quality training simulation capable of effectively replicating real-world training scenarios in a realistic manner and reflective of the actual conditions that exist in the real-world scenario being simulated. The displayed simulation environment enables the operator to perform actual flight maneuvers and to perceive the actual effects of the maneuvers within the depicted environment, while precluding the aircraft from approaching safety envelopes. The simulation allows for training of particular scenarios and environments that would otherwise be too dangerous or difficult to simulate, such as for example: urban warfare combat; a bombing raid in enemy territory; a search and rescue mission over land or sea terrain; a training mission in a mountain range or other rugged terrain; a nap-of-the-earth (NOE) flight route; a threat engagement flight; and the like. The ability to perform actual flight maneuvers in high-risk training scenarios, where such maneuvers may otherwise be problematic to perform, allows for a more realistic and thus a more effective training experience, which in turn enhances the proficiency and level of preparedness of the trainee. Moreover, it saves considerable expenses and resources that would otherwise be required if a similar training session were to be implemented in a real-world environment (despite any inherent dangers). The flight simulation of the present invention also allows for high quality debriefing, as the virtual environment may be recorded and viewed after the training flight, and modifications can be made for subsequent simulation trainings, if necessary, based on a detailed analysis of the training session.

Figure 4:
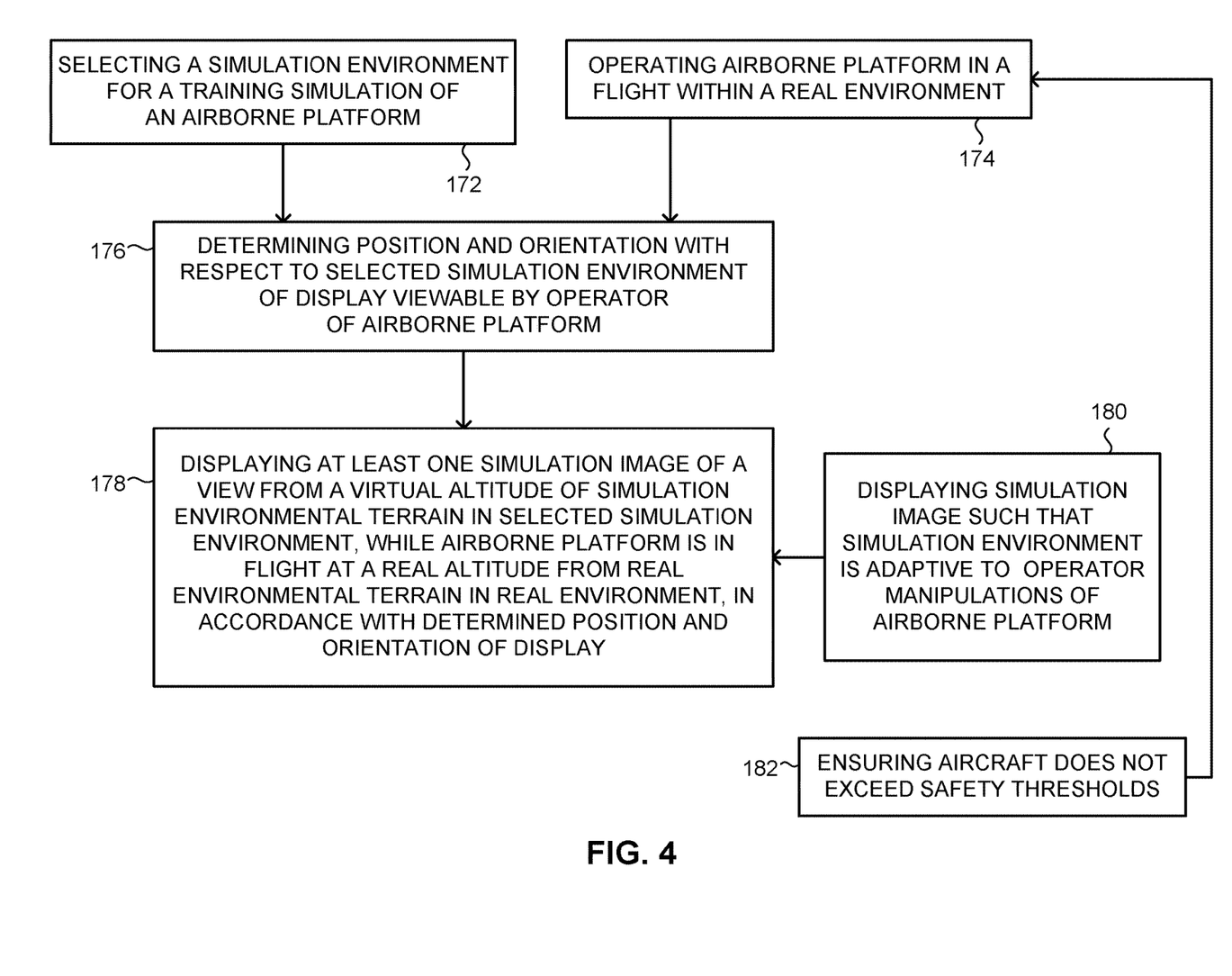
FIG. 4 is a block diagram of a method for displaying a virtual environment during an in-flight simulation, operative in accordance with an embodiment of the present invention.

Reference is now made to FIG. 4, which is a block diagram of a method for displaying a virtual environment during an in-flight simulation, operative in accordance with an embodiment of the present invention. In procedure 172, a simulation environment for a training simulation of an airborne platform is selected. Referring to FIG. 1, system 110 selects a training simulation for an operator of aircraft 100. The selected training simulation is associated with a simulation environment, which may represent a real-world environment or an artificial environment. For example, the simulation environment may be a training flight in low altitude, such as for a search and rescue training mission.

In procedure 174, the airborne platform is operated in a flight within a real environment. Referring to FIGS. 1 and 2, an operator, such as a pilot undergoing a training simulation flight, operates aircraft 100 in a real-world flight, such as by guiding aircraft 100 along a high-altitude flight pattern over a real environmental terrain 140.

In procedure 176, the position and orientation of a display viewable by an operator of the airborne platform is determined with respect to the selected simulation environment. Referring to FIGS. 1 and 2, processor 112 determines the position and orientation of display 114 of aircraft 100, respective of the simulation environment 130 to be simulated. The determination may be made using LOS detector 122 (e.g., which may include: a head/eye tracker, GPS, INS or IMU), navigational parameters of aircraft 100 obtained from ASFI 118 (e.g., aircraft sensors and onboard equipment), or external sources (e.g., a ground radar or ADS-B system).

In procedure 178, at least one simulation image of a view from a virtual altitude of simulation environmental terrain in the selected simulation environment is displayed while the aircraft is in flight at a real altitude from real environmental terrain in the real environment, the simulation image displayed in accordance with the determined position and orientation of the display. The virtual altitude may be respective of the aircraft and/or respective of the real terrain. Referring to FIGS. 1 and 2, display 114 displays a simulation image depicting the simulation environment reflective of determined navigational information of aircraft 100. The simulation image may be displayed in the foreground overlaid conformal onto a view of the external environment, or the simulation image may be the only viewable image on display 114 may be the real-world physical environment as seen through display 114. The displayed simulation may be based on real-time images or previously captured images of the simulation environment, which may be real or artificial.

Referring to FIG. 3, display view 152 depicts a (virtual) low-altitude flight over virtual terrain 140, while display view 156 shows that aircraft 100 is actually in a high-altitude flight over real terrain 140. The simulation image may also include simulated elements representing different objects in the simulation environment, as well as supplementary imagery associated with relevant portions of the virtual environment, to provide relevant information or emphasize certain features.

In procedure 180, the simulation image is displayed such that the simulation environment is adaptive to operator manipulations of the airborne platform. Referring to FIGS. 2 and 3, display view 152 depicts the virtual simulation environment transforming in accordance with the maneuvering of aircraft 100 to provide the perception that the aircraft is moving within the virtual environment. For example, if the operator maneuvers the aircraft towards the left, then the displayed simulation image is updated to reflect a leftward view of the simulation environment in relation to the previous aircraft location within the simulation environment. The simulation may also reflect conditions present in a real environment corresponding to the simulated training scenario, such as the effect of wind or surface motions.

In procedure 182, it is ensured that the airborne platform does not exceed safety thresholds. Referring to FIGS. 1 and 2, system 110 prevents aircraft 100 from exceeding safety thresholds, such as by ensuring that aircraft 100 does not go beyond a maximum altitude or below a minimum altitude, does not enter into a stall condition, and avoids obstacles along the flight path, so as to make certain that the simulation is completed safely and securely.

The method of FIG. 4 is generally implemented in an iterative manner, such that at least some of the procedures are performed repeatedly, in order to provide a dynamic display of a simulation environment which changes in accordance with the real-time maneuvering of the aircraft by the trainee.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A method for displaying a virtual environment during an in-flight simulation, the method comprising the procedures of:
    selecting a simulation environment for a training simulation of an airborne platform;
    operating the airborne platform in a flight within a real environment;
    determining the position and orientation with respect to the selected simulation environment of a display viewable by an operator of the airborne platform;
    displaying at least one simulation image on the display, in accordance with the determined position and orientation, the simulation image comprising a view from a virtual altitude of simulation environmental terrain in the selected simulation environment, while the airborne platform is in flight at a real altitude above real environmental terrain in the real environment, the virtual altitude above the simulation environmental terrain being a lower altitude than the real altitude above the real environmental terrain; and
    displaying the simulation image such that the simulation environment is adaptive to operator manipulations of the airborne platform.

2. The method of claim 1, wherein the airborne platform is subject to physical constraints associated with the simulation environment.

3. The method of claim 1, wherein the display is configured to display at least one virtual element or supplementary image associated with the simulation environment.

4. The method of claim 1, wherein the simulation environment is selected from the group consisting of:
a search and rescue scenario;
an urban combat scenario;
a mountainous terrain;
a nautical terrain;
a low altitude flight;
a nap-of-the-earth (NOE) flight;
an engagement with aerial threats;
a flight formation with other airborne platforms;
a ground troops coordination scenario;
an obstacle avoidance scenario; and
any combination of the above.

5. The method of claim 1, further comprising the procedure of ensuring that the airborne platform does not exceed at least one safety threshold.

6. The method of claim 1, wherein the airborne platform is a helicopter.

7. The method of claim 1, wherein the display is a see-through display, and wherein the simulation image is displayed overlaid onto the external scene.

8. The method of claim 1, further comprising the procedure of performing a statistical analysis of at least one training simulation using a machine learning process.

9. The method of claim 8, wherein the training simulation is customized for the operator, based on information learned about the operator from a statistical analysis using the machine learning process.

10. A system for displaying a virtual environment during an in-flight simulation, the system comprising:
a display, viewable by an operator of an airborne platform;
a detector, configured to detect the position and orientation of the display with respect to a selected simulation environment of a training simulation of the airborne platform; and
a processor, configured to retrieve at least one simulation image comprising a view from a virtual altitude of simulation environmental terrain in the selected simulation environment, while the airborne platform is in flight at a real altitude above the real environmental terrain in the real environment, the virtual altitude above the simulation environmental terrain being a lower altitude than the real altitude above the real environmental terrain;
wherein the display is configured to display the simulation image in accordance with the detected position and orientation, such that the simulation environment is adaptive to operator manipulations of the airborne platform.

11. The system of claim 10, wherein the airborne platform is subject to physical constraints associated with the simulation environment.

12. The system of claim 10, wherein the display is configured to display at least one virtual element or supplementary image associated with the simulation environment.

13. The system of claim 10, wherein the simulation environment is selected from the group consisting of:
a search and rescue scenario;
an urban combat scenario;
a mountainous terrain;
a nautical terrain;
a low altitude flight;
a nap-of-the-earth (NOE) flight;
an engagement with aerial threats;
a flight formation with other airborne platforms;
a ground troops coordination scenario;
an obstacle avoidance scenario; and
any combination of the above.

14. The system of claim 10, wherein the airborne platform is a helicopter.

15. The system of claim 10, further comprising at least one element selected from the group consisting of:
an image sensor, configured to capture at least one image of the real environment;
flight instruments, configured to provide real-time flight parameters of the airborne platform;
a database, comprising images of simulation environments and information relating to training simulations;
a digital elevation map, comprising terrain information; and
a geographic information source, configured to provide real-time information relating to the real environment or simulation environment.

16. The system of claim 10, wherein the display is a see-through display and wherein the simulation image is displayed overlaid onto the external scene.

17. The system of claim 10, wherein the display is selected from the group consisting of:
a head-up display (HUD) of the airborne platform; and
a head-mounted display (HMD) worn by the operator of the airborne platform.

18. The system of claim 10, wherein the processor is further configured to perform a statistical analysis of at least one training simulation using a machine learning process.

19. The system of claim 18, wherein the training simulation is customized for the operator, based on information learned about the operator from a statistical analysis using the machine learning process.

* * * * *